Dec. 18, 1962 R. R. ALUISE ETAL 3,069,026
HANDLING ATTACHMENT
Filed Jan. 30, 1962 8 Sheets-Sheet 1

FIG. 1

INVENTORS
ROBERT R. ALUISE
CHARLES W. WEBB
HOMER EUGENE VIOLETTE

BY Claude Funkhouser
ATTORNEYS

Dec. 18, 1962 R. R. ALUISE ETAL 3,069,026
HANDLING ATTACHMENT
Filed Jan. 30, 1962 8 Sheets-Sheet 6

United States Patent Office 3,069,026
Patented Dec. 18, 1962

3,069,026
HANDLING ATTACHMENT
Robert R. Aluise, Silver Spring, Md., Charles W. Webb, Mountain View, Calif., and Homer Eugene Violette, Wheaton, Md., assignors, by mesne assignments, to the United States of America as represented by the Secretary of the Navy
Filed Jan. 30, 1962, Ser. No. 169,982
23 Claims. (Cl. 214—1)

The present invention relates to handling attachments, and more particularly to handling attachments for transferring missiles and boosters from a supply ship or shore depot to a missile ship.

In the past missiles and boosters have been transferred from a supply source to the magazine of a missile ship by means of a plurality of handling devices with each grasping the missile and booster. This necessitated slow and careful handling since the surface area of missiles and boosters which is capable of withstanding handling loads is extremely limited. That is, the surface area of a typical surface to air missile which is capable of withstanding handling loads is but approximately eight percent of its surface area while but approximately four percent of the surface area of a booster is suitable for handling. In both cases these areas are confined to narrow isolated bands located along the length of the missile or booster.

The instant invention pertains to handling attachments which grasp the circumference of the missiles and boosters at the narrow isolated bands which are suitable for handling. These attachments are then employed to transfer such missiles and boosters and to cooperate with a plurality of transfer devices throughout the transfer so as to minimize contact with the surface areas of the missile or booster being transferred. Thus the instant invention prevents damage to the missile or booster being transferred by materially reducing the probability of inadvertent contact with non-handling surfaces areas.

An object of the present invention is to provide a rapid and positive manner of transferring missiles and boosters.

Another object is to transfer missiles and boosters to a missile ship mating rail automatically and accurately.

A further object of the invention is the provision of handling attachments which are in contact with the missile or booster throughout the entire length of transfer.

Still another object is to provide handling attachments which are strong and lightweight.

Yet another object of the present invention is the provision of handling attachments which are capable of being attached to and removed from a missile or booster quickly.

A still further object is to provide quickly removable handling attachments which sequentially coact with a plurality of transfer devices throughout the transfer of a missile or booster from a supply source to a missile ship.

A yet further object of the invention is the provision of handling attachments which cooperate with stowage devices for securing a missile or booster during stowage and for the purpose of loading and unloading a missile or booster onto and from these stowage devices.

A yet still further object is to provide handling attachments capable of coacting simultaneously with more than one transfer device to effect positive control of a missile or booster at all times during transfer from one transfer device to another.

Other objects and many of the attendant advantages of this invention will be readily appreciated as the same becomes better understood by reference to the following detailed description when considered in connection with the accompanying drawings wherein:

Figure 1:
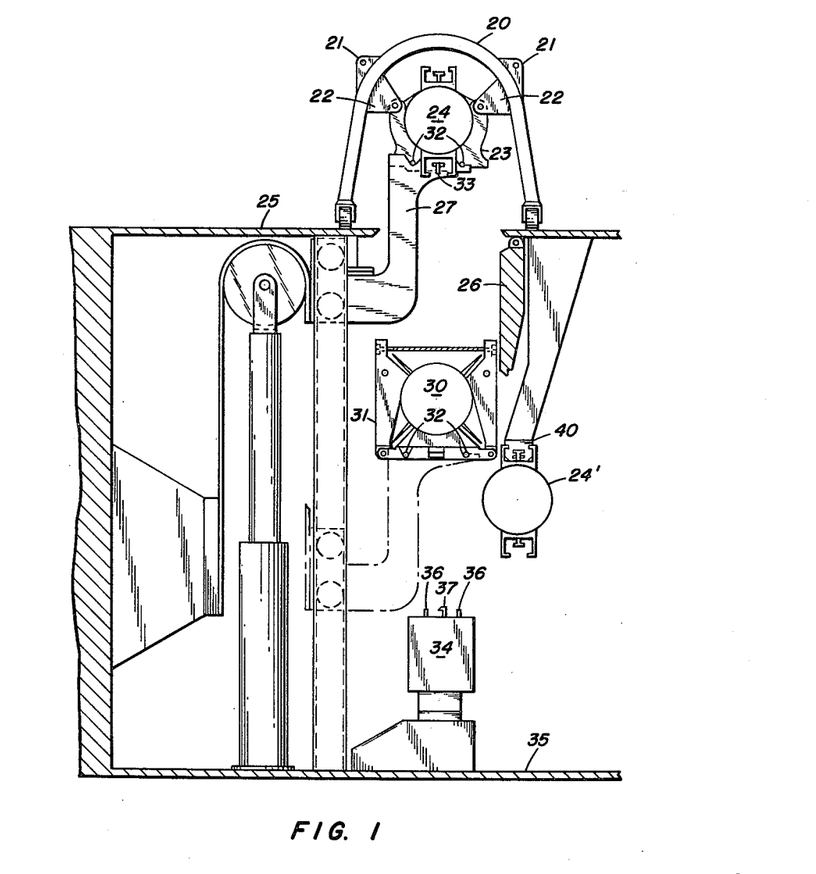
FIG. 1 illustrates the coaction of the handling attachments with transfer devices.

Referring now to the drawings, wherein like reference characters designate corresponding parts throughout the several views, there is shown in FIG. 1 a series of transfer devices which cooperate sequentially with the missile and the booster handling attachments in order to effectuate transfer of missiles and boosters from a supply source to the mating rail 40. On a landing and handling deck 25 is seen a grasshopper dolly 20 which has a pair of supports 21 for transfer of the dolly 20 from a supply source by a sea transfer line or the like. The dolly 20 supports a booster 24 by support members 22 connected to handling attachments 23. The booster handling attachment 23 in turn grasps the booster 24 about its circumference.

To accomplish transfer from the landing deck 25 to the magazine below decks by mating rail 40, the dolly 20 is positioned over a strikedown hatch 26. When the dolly 20 is positioned over the strikedown hatch 26 an elevator 27 which ascends and descends vertically is raised through the hatch to contact the pins 32 on the handling attachment 23. While the pins 32 limit the horizontal movement of the handling attachment and booster arrangement when supported by the elevator the clamp 33 limits vertical movement with respect to the elevator. Shown in FIG. 1 and supported by the elevator 27 is a missile 30 grasped by a missile handling attachment 31. The missile 30 is in the process of being lowered to the transfer car 34. When the elevator 27 descends to the lowermost limit of its travel the handling attachment 30 will be supported on the transfer car which has pins 36 to limit horizontal travel of the handling attachment and missile combination and clamp 37 to limit the vertical movement thereof.

When the handling attachment and missile combination are securely supported by the transfer car 34 and the clamp 33 is released the transfer car is raised to disengage the pins 32 from the elevator 27 and it then travels along the checkout platform 35 to a position directly beneath the mating rail 40. Shown in FIG. 1 is a booster 24' already placed on the mating rail 40.

As is shown in FIG. 1, the missiles and boosters are transferred in alternating sequences. That is, the booster is transferred first, such as booster 24' so that it will be placed on the mating rail and in position to be rammed to the missile 30 in order to mate with missile 30 when missile 30 is subsequently aligned with it. As is also seen in FIG. 1, after the missile 30 is transferred a booster 24 is transferred so that when booster 24' and missile 30 are mated and the assembled round is transferred to the magazine the booster 24 may take the place of booster 24' on the mating rail 40 and await the next missile to be transferred into alignment with it.

It should be understood that as shown in FIG. 1 after the booster 24' is placed on the mating rail the handling attachments are removed and it is moved along the rail to its ramming position. Thus, the booster is placed in position to ram and mate with the missile to be transferred next and it also is removed from its original position where it would interfere with the descent of the elevator 27 and missile 30. It should be further understood that only one elevator exists and that two are shown in FIG. 1 only to illustrate the transfer of both missiles and boosters.

Figure 2:
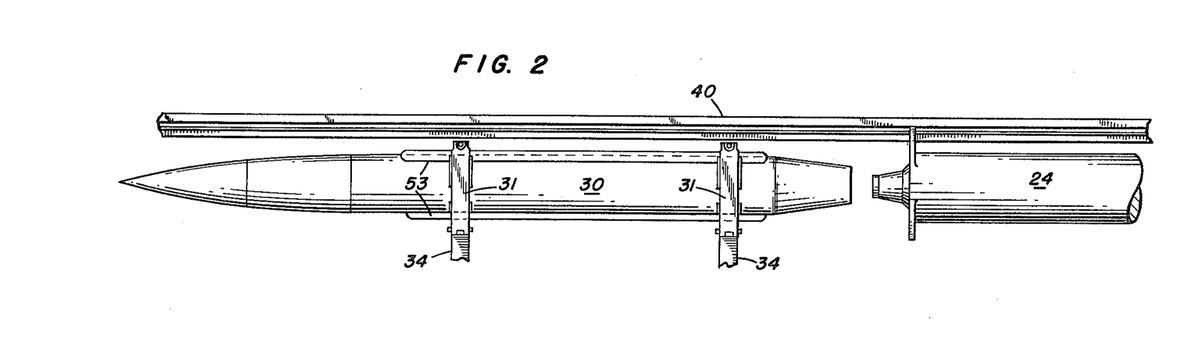
FIG. 2 is a side elevation of a missile grasped by handling attachments and raised into alignment with a booster.
Figure 3:
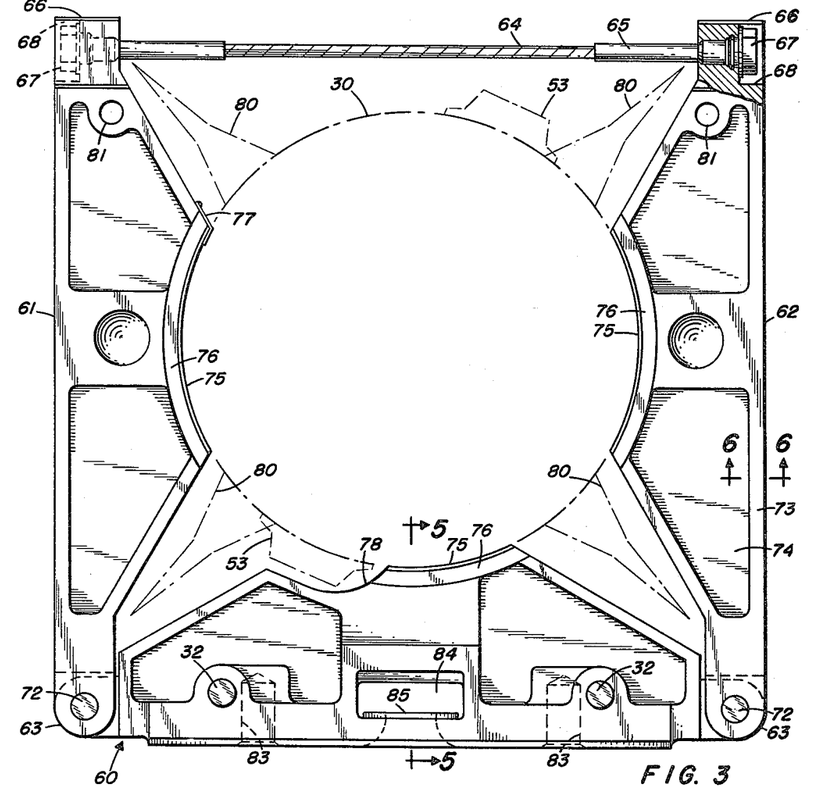
FIG. 3 is a front view of one embodiment of a missile handling attachment.
Figure 4:
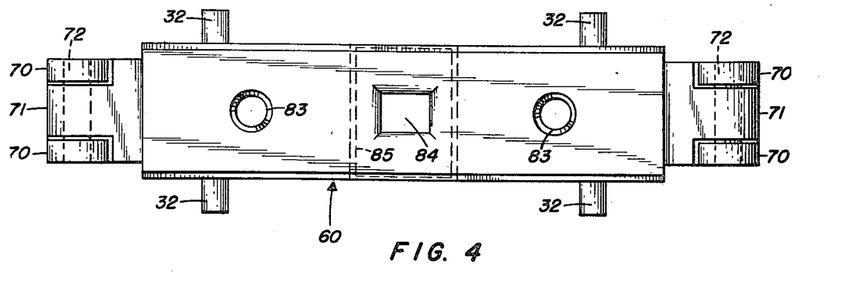
FIG. 4 is a bottom view of the missile handling attachment of FIG. 3.

FIG. 2 sets forth a side view of a missile 30 grasped by handling attachments 31 and supported on the transfer car 34. The missile 30 has been aligned with the overhead mating rail 40 and with a booster 24 engaged with the mating rail. Upon alignment of the missile 30 by the transfer car 34, with the booster 24 the booster will be rammed to missile 30 to mate therewith. After the missile and booster are mated the handling attachments 31 are removed from the missile and the assembled round is moved to the magazine by way of the mating rail 40. One embodiment of the missile handling attachments 31, as best seen in FIG. 3 and FIG. 4, which is the bottom view thereof, has three basic portions, namely, the base portion 60 and the two side portions 61 and 62. The side portions 61 and 62 are connected at hinged corners 63 by employing the tongue and groove hinge method. The hinge 63 comprises the tongue portion 71 of the base element 60 assembled between the ear portion 70 of elements 61 and 62 to form a tongue and groove hinge interconnected by a pin 72. The other ends of the elements 61 and 62 of the handling attachments have cavities 68 through which a bolt 65 having a nut 67 extends to be threadably engaged on a cable 64. The cavity 68 is maintained large enough so as to allow the use of a socket wrench or other wrenches capable of quickly disengaging nut and bolt type elements. The missile handling attachment 31 has arcuate portions 76 on elements 60, 61 and 62 which arcuate portions are constructed to circumscribe a circle equivalent to the circumference of the missile 30 leaving open radial areas so that the dorsal fins 80 of the missile 30 will not interfere with proper grasping of the missile by the handling attachment 31. Between the arcuate portions 76 and the missile is maintained a liner 75 which is employed to protect the skin of the missile from damage by the handling attachments. A ground 77 is employed to overlap a portion of the protective lining 75 to insure that the missile is in a grounded electrical condition. The arcuate portion 76 of base member 60 has a depressed area 78 so as to allow the missile freedom from interference along its longitudinal portion when it has fairing strips 53. It should be understood, of course, that if the missile has neither assembled dorsal fins nor interfering fairing strips, neither the recesses 78 nor radial spaces for the dorsal fins of the missile need be provided for.

Figure 5:
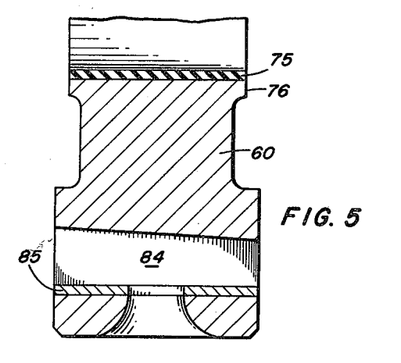
FIG. 5 is a cross-sectional view of the missile handling attachment of FIG. 3 taken along lines 5—5.

The bottom portion 60 of the handling attachment 31 has a plurality of pins 32 and pin cavities 83 for cooperating with various transfer devices when the missile is being transferred from the source of supply to the mating rail 40. Also in the base element 60 is a T cavity 84 having an element 85 along one surface thereof which element is of a hard material which will offer much longer wear and wear resistance than will the body portion 60 which will normally be constructed of light-weight aluminum. By this T cavity the handling attachment 31 is limited in its vertical movement with respect to the transfer device with which the handling attachment cooperates at any given time. The T cavity of the handling attachment 31 can be best seen in FIG. 5 which is a cross-sectional view of FIG. 3 taken along line 5—5.

Figure 6:
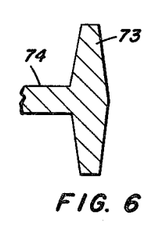
FIG. 6 is a cross-sectional view of the missile handling attachments in FIG. 3 taken along lines 6—6.

The portions 60, 61 and 62 of the handling attachment 31 are of moulded aluminum having a varying cross section of deep and thin sections. As best seen in FIG. 6 which is a cross section of FIG. 3 taken along line 6—6, portion 74 of element 62 is much thinner than the portion 73.

Referring now back to FIG. 1, the relationship of the handling attachment 31 with the various transfer devices shown in FIG. 1 can be seen. That is apertures 81 in elements 61 and 62 are employed in connection with dolly support ears 22 so as to support handling attachment and missile in the dolly during the transfer of the dolly. Pins 32 and the T cavity 84 coact with the elevator 27 and clamp 33 to limit the travel of the handling attachment horizontally and vertically, respectively. Also the pin cavities 83 and the T cavity 84 are formed to coact with pins 36 and clamp 37, respectively, of the transfer car 34. The pins 36 limit horizontal travel with respect to the transfer car 34 and clamp 37 limits vertical travel with respect to the transfer car. Thus, while the missile or booster is physically contacted only by the handling attachments throughout the transfer from the supply source to the missile ship and into the magazine by way of the mating rail, a plurality of other necessary transfer devices cooperate and coact with the handling attachments to provide a safe, accurate and swift transfer of the missile from the supply source to the mating rail.

Figure 7:
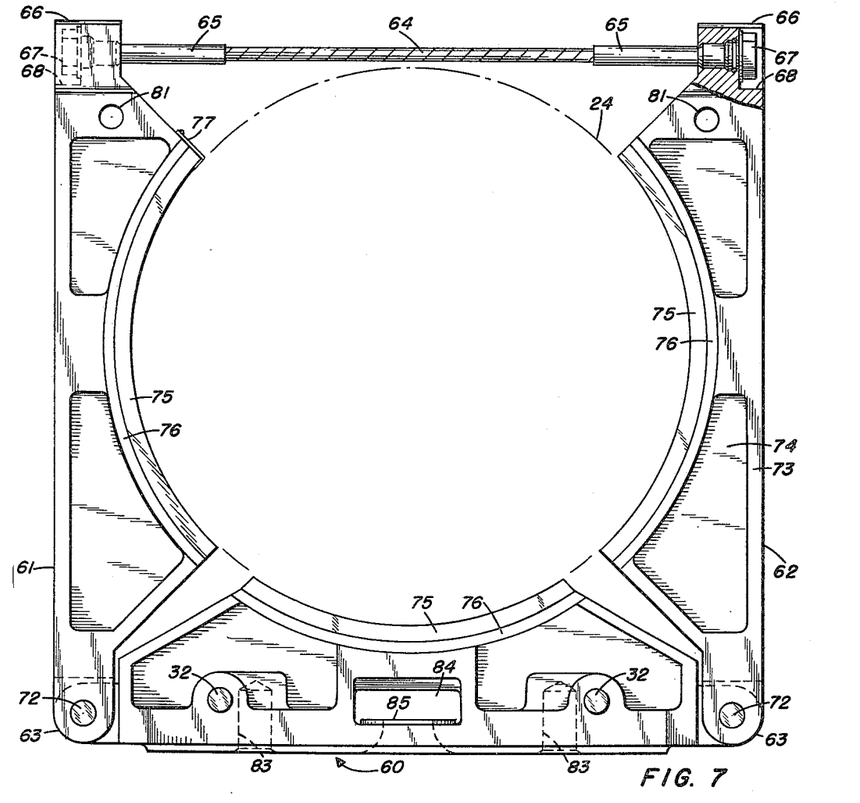
FIG. 7 is a front view of the booster handling attachment.
Figure 8:
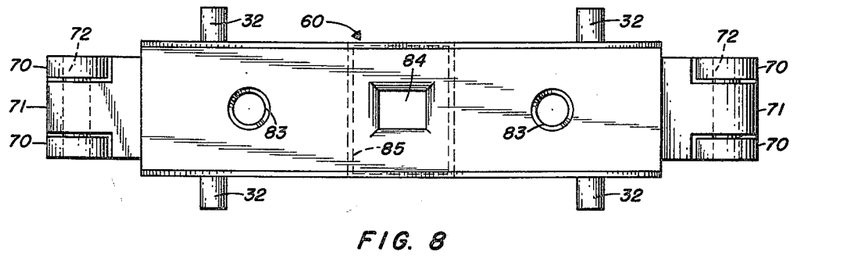
FIG. 8 is the bottom view of the booster handling attachment of FIG. 7.

As best seen in FIGS. 7 and 8, a booster handling attachment 23 employing the same elements as the missile handling attachment 31 of FIG. 3 may be instrumented in the same manner as the missile handling attachment except that the arcuate portions 76 will have a different radius of curvature so as to smoothly grasp the booster 24 which is of a larger diameter than of the missile 30. In other respects, however, the booster handling attachment 23 is comprised of apertures 81, pins 32, pin cavities 83 and the T cavity 84 for coaction with the various transfer devices of FIG. 1 in exactly the same manner as the missile handling attachment 31 of FIG. 3 cooperated with the various transfer devices during transfer from the supply source to the mating rail 40.

Figure 9:
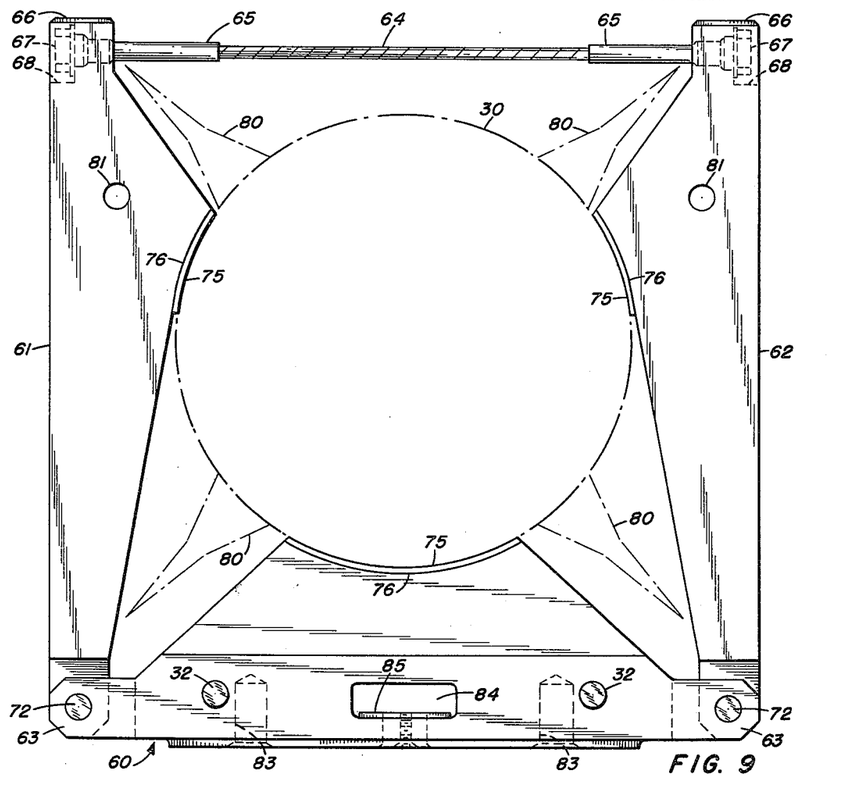
FIG. 9 is a front view of another missile handling attachment.
Figure 10:
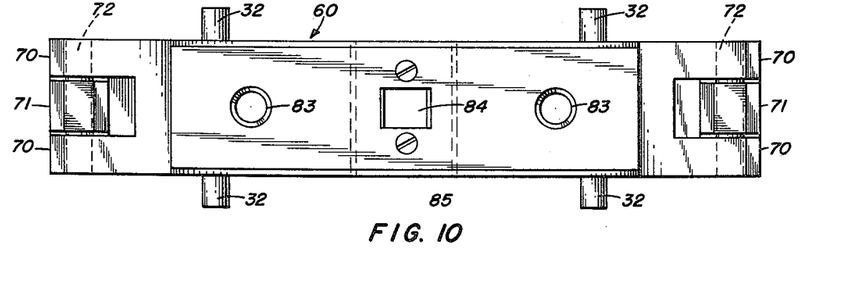
FIG. 10 is the bottom view of the missile handling attachment of FIG. 9.

FIGS. 9 and 10 illustrate a missile handling attachment 31 which is substantially the same as the missile handling attachment set forth in FIG. 3 with the exception that the side portions 61 and 62 have smaller arcuate portions 76 thereby leaving larger radial portions or openings for the dorsal fins 80 of the missle 30 to protrude and avoid interference with the handling of the missile.

Figure 11:
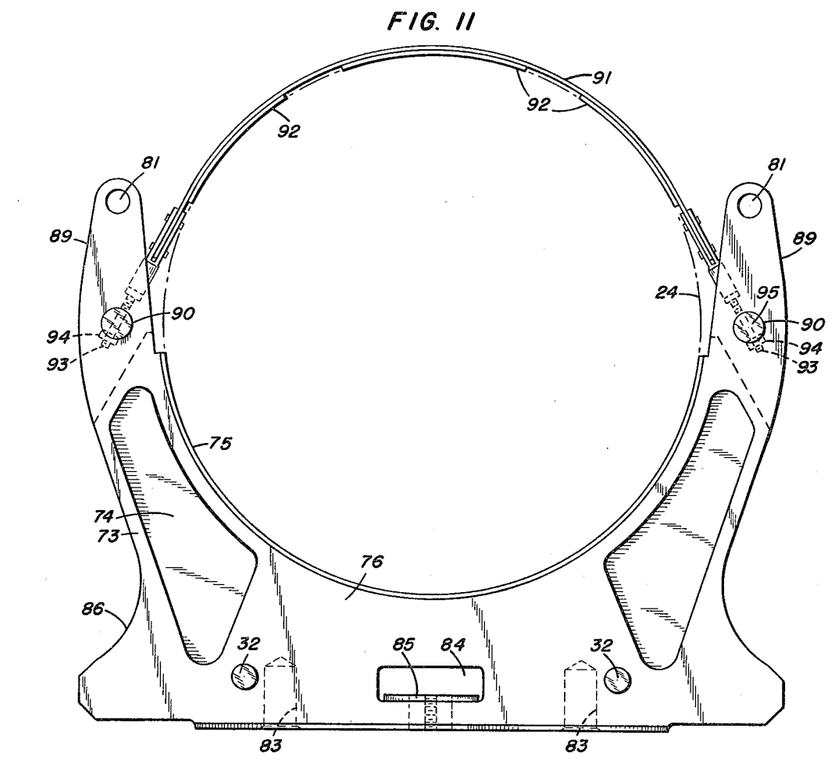
FIG. 11 is a front view of another booster handling attachment.
Figure 12:
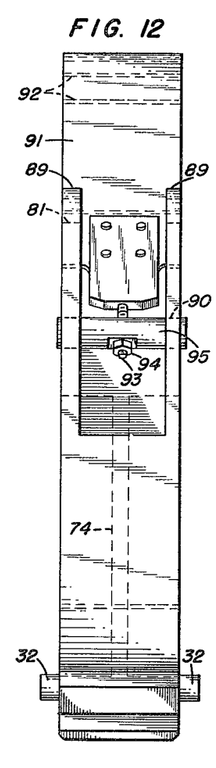
FIG. 12 is the side view of the booster handling attachment of FIG. 11.

FIG. 11 and FIG. 12, which is a side view thereof, illustrate a booster handling attachment 23 which employs the same basic element pins 32, pin cavities 83, T cavity 84 and apertures 81 for cooperation with the various transfer devices but is otherwise significantly different from the booster handling attachment set forth in FIG. 7. The only moving part in the handling attachment set forth in FIG. 11 is the band 91 which is employed to hold down the booster securely in the handling attachment. The handling attachment has ear portions 89 through which apertures 90 are extended. A pin 95, extended through the apertures 90, has the bolt portion 93 extended through its diameter and a nut 94 for engaging the bolt portion of band 91 and thereby drawing the band taut across the top of the booster 24. Between the band 91 and the booster 24 there is maintained a protective coating 92 similar to the protective lining 75 so as to protect the surface of the booster from damage from the band 91.

Figure 13:
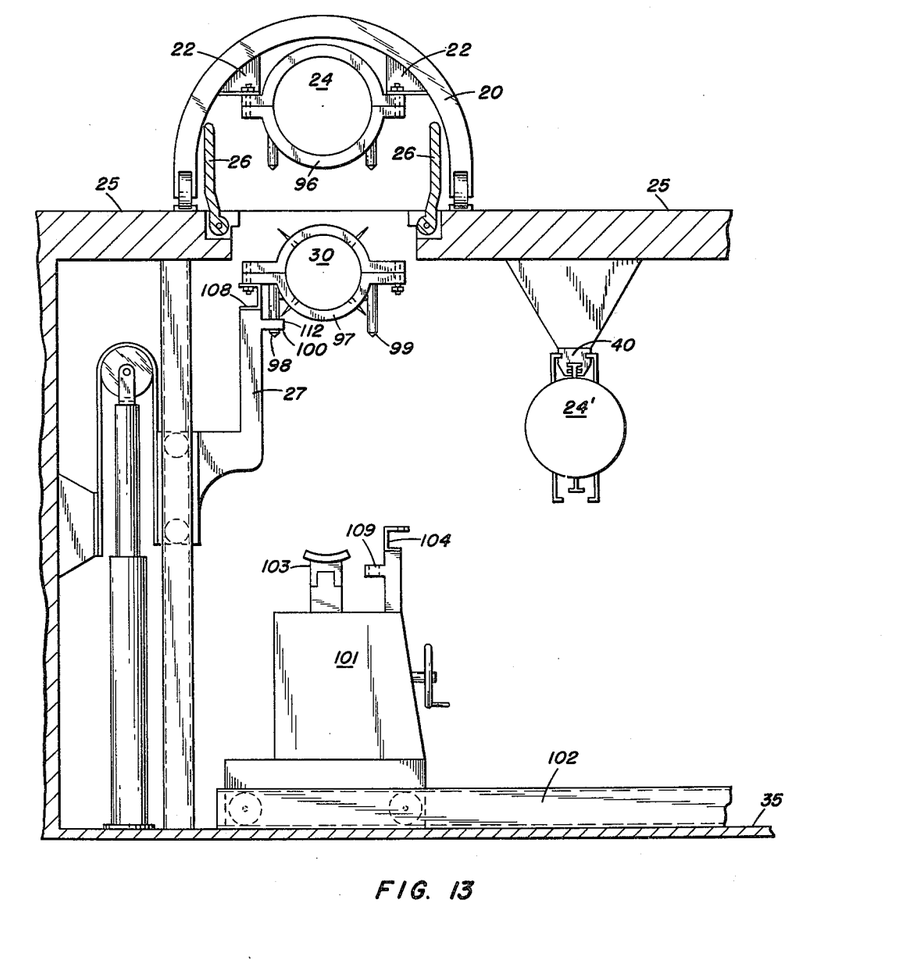
FIG. 13 illustrates a second manner of coaction of missile and booster attachments with various transfer devices employed during the transfer from the supply source to the mating rail.
Figure 14:
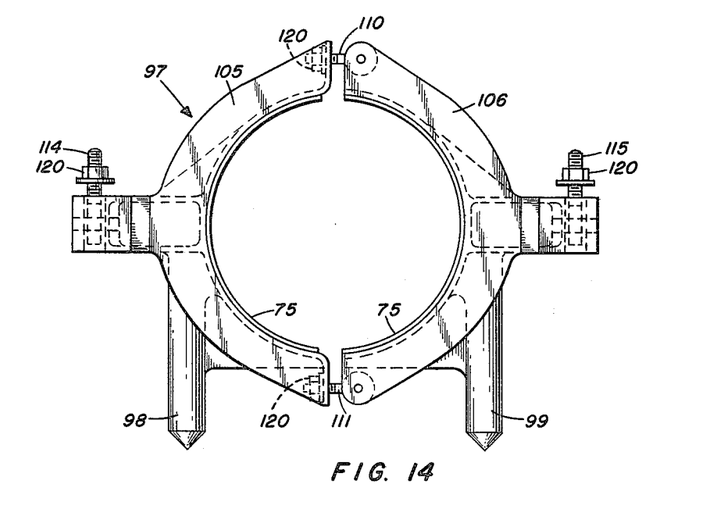
FIG. 14 is a front view of a missile handling attachment.
Figure 15:
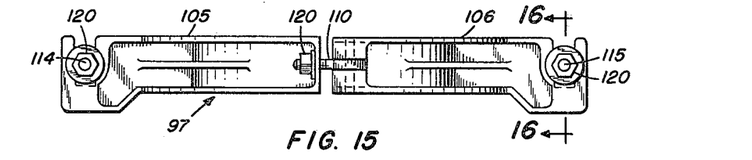
FIG. 15 is a top view of the missile handling attachment of FIG. 14.
Figure 16:
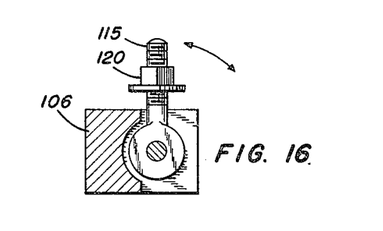
FIG. 16 is a cross-sectional view of the pivotal bolt taken along line 16—16 of FIG. 14.

The handling attachments set forth in FIGS. 14, 15, and 16 require a somewhat modified manner of coaction between the handling attachments in the other various transfer devices such as the grasshopper dolly 20, the elevator 27, and the transfer cart 34. This modification can be best seen in FIG. 13 wherein the booster 24 is connected to a booster handling attachment 96 which is in turn connected to downwardly extending vertical arms 22 of the dolly 20. The elevator 27 has an upwardly extending vertical arm 108 equivalent to the vertical arm 22 of the dolly 20 and a cylindrical cavity 100 in arm 112 capable of receiving the support 98 of the handling attachment 97. The transfer car 101 has a saddle 103 and a handling attachment receptacle 104 equivalent to the handling attachment receptacle of the elevator 27 which has an upwardly extending arm at 108 and a circular receptacle at 100. The transfer car 101 upon engaging the handling attachment raises to disengage the handling attachment from the elevator 27 and then transfers the handling attachment and missile or booster to a position under the mating rail 40.

As can be best seen in FIG. 14, the missile handling attachment 97 comprises two basic parts 105 and 106. Parts 105 and 106 are connected together through pivotal bolts 110 and 111 and drawn taut by nuts 120. Parts 105 and 106 are semi-cylindrical in shape and have a radius of curvature such as to smoothly clasp the missile 30. Protective lining portions 75 are inserted on the internal portions of both parts 105 and 106 to protect the missile to be transferred. Two additional pivotal bolts 114 and 115 with tightening nuts 120 are employed with the missile handling attachment 97. The operation of the pivotal bolt 115 can be best seen in FIG. 16 which is a cross-sectional view taken along lines 16—16 of FIG. 14. Both pivotal bolts 114 and 115 are initially attached to the downwardly extending vertical arms 22 of the dolly 20. When the elevator 27 is raised through the strikedown hatch 26 the cylindrical cavity portion 100 engages the cylindrical handling attachment support 98 and the upwardly extending arm 108 abuts the bottom portion of the handling attachment directly beneath the pivotal bolt 114. It is at this point that both bolts 114 and 115 are disengaged from the vertical arms 22 of dolly 20 and the pivotal bolt 114 is rotated 180° to engage with and to draw in fixed relationship with the arm 108 the handling attachment 97. The elevator 27 is now ready to descend and upon its descent to its lower limit of travel the cylindrical support member 99 of the handling attachment 97 will be inserted and engage with the cylindrical cavity 109 of the handling attachment receptacle 104 and the bottom portion of the handling attachment bearing pivotal bolt 115 will rest upon the upwardly extending receptacle 104, with the missile 30 resting upon the missile saddle 103 and the handling attachment 97 in contact with cylindrical cavity 109 and upwardly extending arm 104. The pivotal bolt 115 is rotated so as to engage the upwardly extending arm 104 and the nut 120 is drawn tight. After disengagement of the pivotal bolt 114 from the upwardly extending arm 108 of the elevator 27 the transfer car 101 will raise the handling attachment 97 and missile 30 so as to clear the support element 98 of the handling attachment from the cylindrical cavity 100 of the elevator and then move the handling attachment and missile along the checkout platform to a position directly beneath the mating rail 40.

As in the transfer of missiles and boosters as in FIG. 1 the missiles and boosters are also alternatively transferred in FIG. 13. That is, first a booster 24' is placed upon the mating rail 40 and then a missile 30 is transferred into alignment with the booster 24' which is rammed to the missile to mate with the missile thereby becoming an assembled round ready to be transferred to the magazine. Modification of the handling attachment in FIG. 14 so as to enable the handling attachment to handle a booster rather than a missile as set forth in FIG. 14, merely requires that the radius of curvature of the internal portions of elements 105 and 106 be of a larger nature so as to encompass the larger circumference of a booster and that the bolts 110 and 111 be longer so as to span a greater gap between portions 105 and 106.

In summarization the use of the handling attachments as set forth in FIGS. 3 to 12 and 14 to 16 are capable of providing satisfactory support to the missile or booster to which they are designed to support throughout the transfer of the missile or booster from the source of supply to the mating rail. That is, the handling attachments are initially connected to and ride with the missile or booster from the initial point of supply source to the mating rail. During travel from the supply source to the mating rail the handling attachments offer the capability of securely grasping the missile in a safe manner without in any manner damaging the missile and coacting with various transfer devices such as a dolly, an elevator and a transfer car so as to accurately, safely and swiftly transfer missiles and boosters to the mating rail of a missile ship.

Additional advantages of the handling attachment are that they offer a quick release from the various transfer devices with which they coact and from either side of the missile or booster which they are supporting. Additionally, the handling attachments are made of lightweight material such as aluminum so that one man may be capable of easily handling them while withstanding the maximum allowable load requirement. The handling attachments also offer the significant advantage of avoiding clamping or coming into contact with various missile and booster aerodynamic surfaces, fairing strips, dorsal fins, or other sensitive elements on the booster, missile, or booster-missile combinations.

Obviously many modifications and variations of the present invention are possible in light of the above teachings. It is, therefore, to be understood that within the scope of the appended claims the invention may be practiced otherwise than as specifically described.

What is claimed and desired to be secured by Letters Patent of the United States is:

1. A handling attachment for handling stores comprising a base member, first and second side members each hinged at one end thereof to opposite ends of said base member, means connected to the free ends of said first and second side members to adjust the relative positions of said side members, said base member and said first and second side members having arcuate body portions substantially forming a circle for grasping stores, means on said arcuate body portions for protecting said stores, means on said first and second side members for engaging and supporting the attachment on a first transfer device in alignment with a vertically movable second transfer device, first base member receiving means in said base member for engaging a second transfer device as the second transfer means moves into engagement therewith, second base member receiving means carried by said base member for engaging a third transfer device as the second transfer device moves the base member into engagement with the third transfer device, and a third base member receiving means carried by said base member for coaction with the second and third transfer devices for sequentially engaging both said second and third transfer devices whereby said stores are transferred by the coaction of a plurality of transfer devices with said handling attachment while being grasped only by said handling attachment.

2. A handling attachment as claimed in claim 1 wherein said means on said first and second side members for engaging said first transfer device comprise apertured portions in said side members in registration with complementary apertures in the first transfer device, said apertured portions receiving pin means for connection of said first transfer device to said side members.

3. A handling attachment as claimed in claim 2 wherein said first base member means for engaging said second transfer device is provided with a plurality of mutually spaced pins carried by said base member for engaging notches formed in said second transfer device to limit horizontal movement of said stores and handling attachment with respect to said second transfer device.

4. A handling attachment as claimed in claim 3 wherein said second base member means for engaging a third transfer device is provided with cylindrical cavities formed in said base member for receiving pins on said third transfer device as the base member moves into engagement with the third transfer device to thereby limit horizontal movement of said stores and handling attachments with respect to said third transfer device.

5. A handling attachment as claimed in claim 4 wherein said third base member means for sequentially engaging said second and third transfer devices is provided with a T-shaped cavity formed in the base member for engaging said second and third transfer devices' linkages to limit vertical movement of said stores and handling attachment with respect to said second and third transfer devices.

6. A handling attachment as claimed in claim 5 wherein said means connected to said free ends of said side members for adjusting their relative positions comprises a flexible element extending between said free ends of each of said side members and adjustably mounted thereon by bolt means having nuts threadedly mounted thereon.

7. A handling attachment for handling missiles and boosters comprising a base member comprising first means on the base member for coacting with complementary means on a first transfer device as the attachment is transferred from a second transfer device to said first transfer device, second means on the base member for coacting with complementary means on a second transfer device as the attachment is transferred from the second transfer device to the first transfer device, third means on the base member for sequentially coacting with complementary means on both said first and said second transfer devices when the attachment is positioned thereon, said second transfer device being movable to transfer the attachment from the third transfer device to the first transfer device, a first arcuate portion on the base member, and a protective liner over said first arcuate portion; a first side member hinged at one end thereof to a first end of said base member, comprising a second arcuate portion, a protective liner over said second arcuate portion, and fourth means on said first side member for coacting with complementary means on the third transfer device for connecting the attachment thereto in an initial transfer position with respect to the second transfer device; and a second side member hinged at one end thereof to a second end of said base member, comprising a third arcuate portion, a protective liner over said third arcuate portion, and fifth means on said second side member for coacting with complementary means on the third transfer device for connecting the attachment thereto in an initial transfer position with respect to the second transfer device; tightening means between the free ends of said first and second side members for tightening said first and second side members so that said first, second, and third arcuate portions are substantially aligned as arcuate portions of a circle whereby said stores are grasped by said arcuate portions thereby being securely held while said handling attachments coact with said first, second, and third transfer devices to transfer said stores.

8. A handling attachment as claimed in claim 7 wherein said first means for coacting with a first transfer device comprises horizontal pins on the base member for engaging with notches on a strikedown elevator as the elevator moves into engagement therewith to limit horizontal movement of said handling attachment with respect to said elevator.

9. A handling attachment as claimed in claim 8 wherein said second means for coacting with a second transfer device is provided with cylindrical cavities on the base member for engaging vertical pins on a transfer car as the elevator moves the base member into engagement therewith to limit horizontal movement of said handling attachment with respect to said transfer car.

10. A handling attachment as claimed in claim 9 wherein said third means for sequentially coacting with said first and second transfer devices incorporates a T-shaped cavity in the base member for engaging latching linkages of said strikedown elevator and said strikedown car as the base member engages the elevator and car.

11. A handling attachment as claimed in claim 10 wherein said fourth and fifth means for coacting with the third transfer device comprise ear means on said third transfer device and having apertures in registration with apertures in said first and second side members, said apertures receiving pin means for connection to support members of a dolly.

12. A handling attachment as claimed in claim 11 wherein said tightening means comprise nut and bolt means carried by each side member and connected to a cable for urging said first, second, and third arcuate portions in grasping relationship with the circumference of a missile.

13. A transfer apparatus for missiles and boosters comprising, in combination, a handling attachment for supporting a missile and a booster during a transfer operation, a first transfer device for supporting the handling attachment in an initial position, a second transfer device movable in one direction to receive and support the handling attachment as the second transfer device is moved a predetermined amount, a third transfer device for receiving and supporting the handling attachment as the second transfer device moves a predetermined amount in the other direction, said handling attachment including a first arcuate member comprising a protective lining on the concave surface of said first arcuate member, outwardly extending flanges at the ends of said first arcuate member, grooves in said flanges extending inwardly from the outermost flange extremities, a first body portion of said first arcuate member disposed at the midpoint of the convex surface of said first arcuate member and extending horizontally outwardly, a pivotal means disposed at the outer extremity of said first body portion of said first arcuate member for engaging said first transfer device and for subsequently engaging the second transfer device as the second transfer device moves in said one direction a predetermined amount, and a second body portion of said first arcuate member extending vertically downward in a perpendicular relationship with said first body portion of said first arcuate member for engaging said second transfer device upon movement thereof said predetermined amount in said other direction; and a second arcuate member comprising a protective lining on the concave surface of said second arcuate member, pivotal means disposed at the terminals of said second arcuate member for pivotally engaging said first arcuate member through said grooves of said first arcuate member, a first body portion of said second arcuate member disposed at the midpoint of the convex surface of said second arcuate member and extending horizontally outwardly, a pivotal means disposed at the outer extremity of said first body portion of said second arcuate member for engaging said first transfer device and for subsequently engaging said third transfer device as the second transfer device moves said predetermined amount in said other direction and a second body portion of said second arcuate member for engaging said third transfer device as the second transfer moves said predetermined amount in said other direction whereby said stores are transferred by the coaction of a plurality of transfer devices with said handling attachments while being grasped only by said handling attachments.

14. The combination of structure as claimed in claim 13 wherein said pivotal means disposed at the outer extremity of said first body portion of said first arcuate member comprises a first pivotal nut and bolt adapted to engage a supporting member of a dolly to support the handling attachment in said initial position and subsequently movable into engagement with a strikedown elevator when the elevator moves said predetermined amount in said one direction.

15. The combination of structure as claimed in claim 14 wherein said second body portion of said first arcuate member comprises a cylindrical support portion adapted to engage a cylindrical cavity in said strikedown elevator when the elevator moves said predetermined amount in said one direction.

16. The combination of structure as claimed in claim 15 wherein said pivotal means disposed at the terminal of said second arcuate member comprise second and third pivotal nuts and bolts engageable with the first arcuate member for urging said first and second arcuate members in circumferential contact with a missile.

17. The combination of structure as claimed in claim 16 wherein said pivotal means disposed at the outer extremity of said first body portion of said second arcuate member comprises a fourth pivotal nut and bolt adapted to engage a supporting member of a dolly when the handling attachment is in said initial position and to engage the transfer car when the elevator moves said predetermined amount in said other direction.

18. The combination of structure as claimed in claim 17 wherein said second body portion of said second arcuate member comprises a cylindrical support portion adapted to engage a cylindrical cavity in said transfer car when the elevator moves said predetermined amount in said other direction.

19. A handling attachment for handling a missile booster comprising a body member comprising a concave cylindrical surface to cradle said booster, an elongated flat base opposite said concave cylindrical surface, first cavity means in said flat base for coacting with complementary means on a first transfer device when the attachment is transferred from a second transfer device to the first transfer device, second cavity means in said flat base for coacting with complementary means on said first transfer device and a second transfer device when the attachment is transferred from a second transfer device to the first transfer device, means extending perpendicularly to the elongated dimension of said flat base and parallel to the longitudinal dimension of said semi-cylindrical body portion for coacting with complementary means on said second transfer device when the attachment is transferred from a third transfer device to the second transfer device, two spaced apart vertically extending arm portions at each of the opposite ends of said elongated flat base surface, means in each of said arm portions for engaging a third transfer device to support the attachment in an initial transfer position with respect to the second transfer device, and cylindrical apertures parallel to the longitudinal dimension of said semi-cylindrical surface in each of said arm portions; a protective liner for covering said concave surface; cylindrical means carried by said arm portions having an aperture through the diameter thereof for joining said cylindrical apertures of said two vertically extending arm portions at each of the opposite ends of said elongated flat base; a metallic band comprising bolt means at each end thereof for insertion through said aperture in said cylindrical means and nut means for tightening said metallic band to thereby firmly grasp said booster between said concave surface and said metallic band; and a protective liner on said surface of said metallic band to protect said booster from damage whereby said booster is grasped by said handling attachment which coacts in a sequential manner with said transfer devices to transfer said booster from a supply source to the missile ship.

20. A handling attachment as claimed in claim 19 wherein said means in said arm portions for engaging a third transfer device comprise complementary cylindrical apertures on the arm portions and a dolly for receiving attaching pins to support the attachment in said initial transfer position.

21. A handling attachment as claimed in claim 20 wherein said means extending perpendicularly to the elongated dimension of said flat base for coacting with said second transfer device comprises cylindrical pins on the flat base extending outwardly therefrom to engage said complementary means on a strikedown elevator as the elevator moves into engagement with the attachment for transfer from said dolly to a transfer car.

22. A handling attachment as claimed in claim 21 wherein said first means in said elongated flat base for coacting with said first transfer device incorporates cylindrical cavities formed in the base member for receiving pins on said transfer car as the elevator moves the attachment into engagement therewith for transfer from said strikedown elevator to a mating rail.

23. A handling attachment as claimed in claim 22 wherein said second means in said elongated flat base for coacting with said first and second transfer means incorporates a T-shaped cavity centrally disposed in the flat base for sequentially engaging latches of said strikedown elevator and said transfer car for maintaining vertical stability during transfer from said dolly to said elevator, from said elevator to said transfer car, and from said transfer car to said mating rail.

References Cited in the file of this patent

UNITED STATES PATENTS

| | | |
|---|---|---|
| 2,588,156 | Ogilvy | Mar. 4, 1952 |
| 2,925,980 | Nearman | Feb. 23, 1960 |
| 3,038,614 | Morley et al. | June 12, 1962 |